United States Patent [19]

Hamar

[11] Patent Number: 5,224,052
[45] Date of Patent: Jun. 29, 1993

[54] LASER ALIGNMENT CONTROL SYSTEM

[76] Inventor: Martin R. Hamar, 70 Linden Tree Rd., Wilton, Conn. 06897

[21] Appl. No.: 427,759

[22] Filed: Oct. 26, 1989

[51] Int. Cl.⁵ .................... G01B 11/00; G06F 15/20
[52] U.S. Cl. .................... 364/474.34; 364/474.08; 364/551.02; 356/400; 356/141; 356/152
[58] Field of Search ............... 356/401, 400, 141, 152; 364/551.02, 474.34, 474.08; 33/286, 645, DIG. 12

[56] References Cited

U.S. PATENT DOCUMENTS

| | | | |
|---|---|---|---|
| 4,483,618 | 11/1984 | Hamar | 356/383 |
| 4,566,202 | 1/1986 | Hamar | 356/141 |
| 4,627,725 | 12/1986 | Nishio et al. | 356/152 |
| 4,656,896 | 4/1987 | Bietz et al. | 356/152 |
| 4,679,940 | 7/1987 | Hamar | 356/400 |
| 4,718,759 | 1/1988 | Butler | 356/152 |
| 4,840,483 | 6/1989 | Haffner | 356/400 |

FOREIGN PATENT DOCUMENTS

3721296   3/1988   Fed. Rep. of Germany ...... 356/152

*Primary Examiner*—Parshotam S. Lall
*Assistant Examiner*—V. Trans
*Attorney, Agent, or Firm*—Anthony J. Casella; Gerald E. Hespos

[57] ABSTRACT

A laser alignment control system comprises a method and apparatus wherein a rotating member such as a spindle can be properly aligned with a workpiece for manufacturing operations thereon. The system comprises a laser whose beam impinges on a target with the laser and target being interchangeably mounted on a spindle and a "master part". Information from the target is fed through interface circuitry to a computer which calculates an "effective target" relative to the shim feet under the movable master part or spindle. This "effective target" gives the system capability for aligning the operating member both as to coincidence of location and appropriate incident angle with points within the workpiece which are physically inaccessible. The computer outputs information onto a multiplicity of display screens wherein an operator can align the spindle with the "master part" axis by a series of shimming movements. The major steps of spindle alignment comprise making the ways of the wingbase supports for the spindle straight, adjusting the wingbase ways such that they are parallel to the "master part" axis, making the spindle axis parallel to the "master part" axis, and centering the spindle to the "master part" axis.

9 Claims, 8 Drawing Sheets (1) LINE: #1 BLOCK LINE
(2) STATION: #23
(3) HEAD: 3 RIGHT
(4) TARJET: #1T-261
(5) ORIENTATION: 12-6 O'CLOCK
(6) [*CONTINUE*]

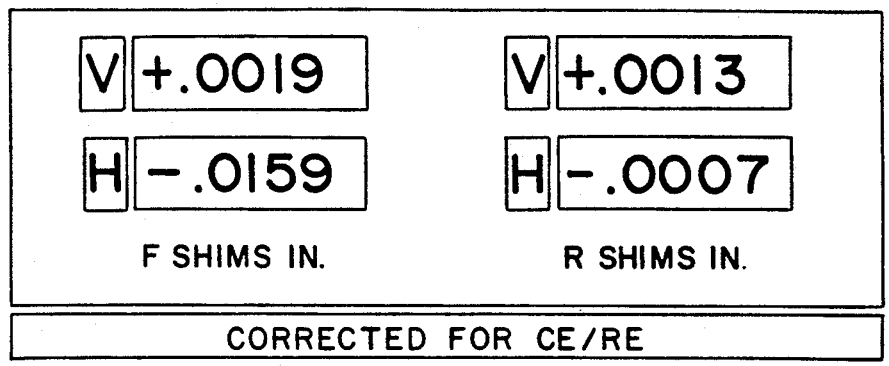

FIG. 10

TARGET: T-261 TARGET CONNECTED TO PART A

CURSOR → 1.000 (VERTICAL — ANGULAR MODE)
1.000 (VERTICAL — ANGULAR MODE)
1.000 (HORIZONTAL — ANGULAR MODE)
1.000 (VERTICAL — CENTER MODE)
1.000 (HORIZONTAL — CENTER MODE)

-.0250  ← ACTIVE WINDOW

FIG. 11

(1) OPPOSED SPINDLES
(2) (NOT SELECTED)
(3) ADJUSTBLE ON LEFT SIDE
(4) TARGET ON RIGHT SIDE
(5) TWO POINT SHIM
(6) NOT SELECTED
(7) SHIM ON RIGHT SIDE
(8) HORIZ. FEET BEHIND
(9) VERT. FEET BEHIND
 ✱✱✱CONTINUE✱✱✱

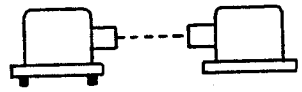

LINE    : #4 BLOCK LINE
STATION : #24
HEAD    : 3A
FILE NAME: HD001001.001

FIG. 12

A = 2.000 IN.
B = 22.500 IN.
C = 10.000 IN.
D = 3.000 IN.
E = 22.500 IN.
F = 10.000 IN.
 ✱✱ TOGGLE UNITS (mm or in.)
✱✱ ✱✱✱CONTINUE✱✱✱

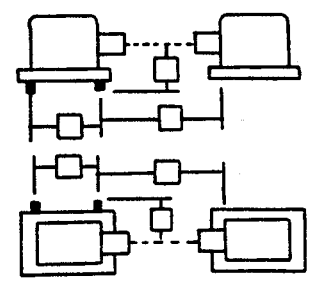

VC is calibrated Vertical Center Reading (Reading from interface−KVC)*Cal factor
HC is Calibrated Horiz Center Reading (Reading from interface−KHC)*Cal factor VA is Calibrated Vertical Angle Reading (Reading from interface−KVA)*Cal Factor
HA is Calibrated Horiz Angle Reading (Reading from interface−KHA)*Cal Factor KVC etc are the correction TCE's EVC = Efective Vertical Center Reading (Reading as if tgt were located at ECP)
EHC = Efective Horiz Center Reading (Reading as if tgt were located at ECP)

EVA = Efective Vertical Angle Reading (Reading as if tgt were located at ECP)
EHA = Efective Horiz Angle Reading (Reading as if tgt were located at ECP)

Note: Ecp=Efective Cell Plane is located over front foot of moving head

Sn is a reading sign corrector. It = +1 for Screen 4A and −1 for 4B

LFV, AND LFH are the distance from the ROT to the front foot on the moving unit

SNH= +1 for 8B else = −1
SNV= +1 for 9B else = −1

| V | FFV=(VC−VA*(LFV*SNV)*SN)+ABS(CFV*(1−COS(VA))) | RFV=FFV+VA*FRV | FAH=−HA*SN*FRH |
|---|---|---|---|
| H | FFH=(HC−HA*(LFH*SNH*SN))+ABS(CFH*(1−COS(HA))) | RFH=FFH−HA*SN*FRH | |

LASER ALIGNMENT CONTROL SYSTEM

BACKGROUND OF THE INVENTION

Automated manufacturing processes often require precise machining or manufacturing operations to be performed by at least one machine on a workpiece. For example, automated industrial machines may be required to initially bore one or more holes in a piece of stock material. The same machine or a second machine may then be operative to chamfer or enlarge the entrance to the previously bored hole. Still another machine or another part of the original machine may then be operative to tap threads into at least a portion of the previously bored hole. Continuing with this example, the axis of the hole being bored and tapped may be obliquely aligned to adjacent surfaces of the stock material, and at least portions of the machining operation may take place at a relatively inaccessible location within the stock material. Machining operations of this type are carried out widely, for example, in the automotive industry. Large numbers of machining operations must be carried out on engine blocks and on the housings for carburetors, fuel pumps, distributors and such. A very high degree of precision generally is required for such machining operations. This great precision not only improves the quality of the part being produced, but also increases tool life and reduces down time for a machine line. Even small improvements in the currently employed automated machine lines and corresponding reductions in down time can result in very significant cost savings.

All automated machine tool equipment includes means for adjusting the relative alignment between the machine tool and the workpiece. Some manufacturing lines may be adapted to adjust the position and alignment of the machine, others enable adjustments to the position and alignment of the workpiece, while still others enable adjustments to be effected on both the machine tool and the workpiece. The particular arrangement for adjustability will depend, in part, upon the manner of movement of the machine tool and/or the workpiece during a machining operation. Typically adjustments to the machine tool and/or the workpiece are carried out by shim assemblies which are adjustably positioned between the machine tool and a base and/or between the workpiece and a base.

Machine tool alignment typically is checked by employing a master part. A master part is a precisely manufactured piece of stock material that accurately duplicates at least a portion of a specified part. The position and alignment of the machine tool and the master part can be compared, and adjustments to one or both may be effected as needed.

The most widely employed prior art apparatus for checking alignment includes mechanical or electromechanical gauges and/or instruments. The spatial positions and orientations of tools and master parts can be determined by mechanical means which may be operatively connected to electronic readouts to provide an indication of alignment errors. These mechanical or electromechanical gauges are generally complex, costly pieces of equipment that are specifically dedicated to a particular machine or a particular type of machine. Additionally, even the most sophisticated mechanical or electromechanical gauge is subject to geometric distortion in response to the effects of gravity, temperature changes or other variables.

Laser beams are known to define a substantially straight line that is dimensionally stable over a relatively long distance. Lasers have been used in combination with photosensitive targets that are operative to sense and identify the location of the center of energy of a laser beam impinging thereon. This combination of a laser emitter and a photosensitive target have proved to be extremely efficient and accurate for measuring alignment between two spaced apart objects. In particular, the laser emitter may be mounted to one object to be aligned while the photosensitive target is mounted to the other object to be aligned.

A background discussion of early work in laser alignment is presented in *Laser Alignment In Industry*, ASTME Technical Paper MR68-408, 1968 and in *Laser Alignment—Current Uses And Applications*, SME Technical Paper MR76-864, 1976.

The operative part of a photosensitive target is a small planar photocell rigidly mounted in a housing. It is often extremely difficult to ensure that the surface of the photocell in the housing of the target is disposed at the preferred target point in the machine tool or master part to be aligned. In particular, the photocell often is disposed forwardly or rearwardly of the point to be aligned or is angularly aligned thereto because of geometric constraints of the target housing, the master part or the machine tool. These errors in the mounting position would yield measurement errors that would offset the potential accuracies of the laser alignment system. These problems were overcome by U.S. Pat. No. 4,483,618 which issued to Martin R. Hamar on Nov. 20, 1984. In particular, the target of U.S. Pat. No. 4,483,618 includes a mirror disposed such that a laser beam incident upon the mirror is reflected to a photocell. The photocell is disposed such that the optical distance between the reflective surface of the mirror and the photocell is equal to the distance between the reflective surface on the mirror and a point on the workpiece or tool to which alignment will be compared. These equal distances enable accurate measurements for those instances where it is inconvenient or impossible to actually place the photocell at the desired measurement point. This equidistant relationship ensures that the target of U.S. Pat. No. 4,483,618 will provide accurate readings despite any angular misalignment of the target housing on the object to be aligned. Despite these many advantages, a target manufactured in accordance with U.S. Pat. No. 4,483,618 may be geometrically well suited for one master part or machine tool, but not geometrically well suited for a different master part or machine tool. The structural requirements of these targets makes it impractical to consider adjustably mounting the photocell relative to the mirror to better accommodate geometric constraints of the particular machine system being aligned.

Another very significant laser alignment apparatus is shown in U.S. Pat. No. 4,566,202 which issued to Martin R. Hamar on Jan. 28, 1986. U.S. Pat. No. 4,566,202 shows a laser emitter which can be mounted in a spindle or chuck of a rotating tool holder. The laser emitter of U.S. Pat. No. 4,566,202 is used in combination with a photosensitive target which may be the target of the above described U.S. Pat. No. 4,483,618. The laser apparatus of U.S. Pat. No. 4,566,202 is used by rotating the tool holder in which the laser emitter is mounted. An improperly aligned tool holder will cause the laser beam to generate an annulus on the target mounted in the master part. The displacement and angular alignment of the laser beam can be accurately determined by readings from the target and appropriate adjustments can be made. Although this system is extremely effective, it may require the technician to perform various arithmetic calculations to determine the type and amount of misalignment and the adjustments that would be required to correct the misalignment. These arithmetic calculations may go beyond the abilities of the technician or machinist responsible for ensuring proper alignment. Microprocessors with appropriate software have been made available through Hamar Laser Instruments, Inc. to facilitate certain of these mathematical calculations. However, some technicians have encountered difficulties in working with the available microprocessors, computers and related software. Some of the difficulties have related to the need to convert error readings into actual adjustments. Other technicians have encountered difficulties as they move the available laser alignment equipment from one machine tool and work station to another on a particular manufacturing line, or as they move the laser equipment from one manufacturing line to another. In particular, a technician may have to employ different series of alignment steps and calculations depending upon the equipment being aligned. On some equipment the laser emitter is most conveniently mounted to the tool holder, while on other equipment the laser emitter is most conveniently mounted on the master part. In some instances adjustments are most conveniently made to the tool holder, while in other instances adjustments are more readily made to the master part. Although the laser alignment equipment shown in U.S. Pat. No. 4,483,618 and in U.S. Pat. No. 4,566,202 are sufficiently adaptable to be used on virtually all machine tool systems, the differences in the laser set up, mathematical calculations and alignment steps have often been confusing to the typical technician.

The prior art further includes U.S. Pat. No. 4,679,940 which also issued to Martin R. Hamar. U.S. Pat. No. 4,679,940 relates to a control system for a photosensitive target for indicating incidence of the beam on the target, for shifting the electrical sensing center of the photocell to the center of the target housing and for compensating for variations in laser beam intensity.

Although the above described laser alignment systems are extremely effective and accurate, it is desirable to provide an improved laser alignment system that can be more readily employed and understood by field technicians.

Accordingly, it is an object of the subject invention to provide an improved laser alignment system for aligning machine tools and other apparatus having parts that are movable relative to one another.

It is another object of the subject invention to provide a laser alignment system that avoids the need for mathematical calculations by the technician using the system.

It is a further object of the subject invention to provide a laser alignment system that can be used with any of a plurality of different machine tools in an industrial workplace.

Yet another object of the subject invention is to provide a laser alignment system that accurately identified displacement and angular alignment errors and that further identifies the specific machine or workpiece adjustments needed to correct the errors.

SUMMARY OF THE INVENTION

The subject invention is directed to a laser alignment system which comprises a laser emitter and a photosensitive target. The target comprises at least one photocell which is mounted in a housing and which is operative to identify the location of the center of energy of a laser beam impinging thereon. The target employed in the system of the subject invention includes mounting means for mounting the target on either the master part or in the spindle or other such mounting means of a rotatable tool. Similarly, the laser emitter includes mounting means for mounting the laser emitter either on the master part or in the spindle or other such mounting means of the rotating tool. Thus, the laser emitter and the target are interchangeably mountable in either the master part or the rotating tool, with the selection being based upon the particular construction of the system being aligned and on the preference of the technician performing the alignment.

The master part and/or the rotating tool may comprise prior art means for adjusting their respective location and alignment. In most instances, the adjustment means will comprise shim assemblies or shim packs, and will be referred to herein generally as shims. However, it is to be understood that the term shim, as employed herein, is not intended to be limiting, and is intended to encompass other adjusting means for the tool and the workpiece.

The system of the subject invention further comprises a data acquisition subsystem or interface which is operatively connected to the target to receive electrical signals from the one or more photocells of the target. The signals generated by the one or more photocells of the target are indicative of the location of the center of energy of the laser beam impinging thereon. The known interfaces for use with such targets enable the signals generated by the targets to be converted into X-Y displacement data and angular alignment data.

The system of the subject invention further comprises a computer which is operatively connected to the interface. The computer is operative to store, selectively recall and use data describing a plurality of different machine tool systems in a manufacturing plant, any one of which can be aligned by the subject system. This input data describing the various machine tool stations that may be aligned includes an identity of the portion of the system that is most readily adjustable. For example, as noted above, some work stations will be constructed such that adjustments are more readily made to the master part, while other work stations are constructed to more readily facilitate adjustments to the machine tool head. The more readily adjustable portion of the work station is identified as the "movable unit". The "movable unit" is selected by the technician based upon his or her understanding of the machine layout. The "movable unit" may vary from one station to the next, and the designation may readily be changed by the technician.

The computer of the subject invention also functions to generate an "effective target". The "effective target" is a mathematical target that is always effectively placed on the designated "movable unit" by the computer. Thus, the computer places the "effective target" on the "movable unit" even if the system configuration is such that the actual target is more conveniently placed on the component that is not readily adjustable. The "effective target" concept also facilitates the alignment to positions inside a machine tool or workpiece that would not otherwise be physically accessible. Rather, the computer will perform the mathematical calculations to place the "effective target" at the desired location even though it may not be possible or convenient to place the actual target at that location.

The subject invention also is directed to an efficient method which comprises the steps of making the ways of the wing base or spindle holder straight; adjusting the wing base ways parallel to the master part axis; making the spindle axis parallel to the master part axis and centering the spindle to the master part axis. In each of these operative steps of the subject method, the computer provides a clear, simple visual readout which may provide instructions to the technician along with numerical and graphic data identifying both the raw error and the adjustments needed to correct the error on the particular machine tool station being aligned. In particular, the computer will provide graphic displays indicative of the top and side views of both the rotating tool and the master part to be aligned. The graphic displays of these operative portions of the system show the direction of misalignment therebetween. A center line picture changes on the computer display in real time as the alignment is adjusted. Numerical angle and centering errors also are shown at the same time. The computer also is operative to generate certain portions of the alignment information in large numbers which can be viewed from a considerable distance, and thereby enables appropriate adjustments to be made at locations on the system remote from the computer.

BRIEF DESCRIPTION OF THE DRAWINGS

FIG. 10 illustrates a Main Numerical Display Screen with information thereon generated by the computer of the present invention.

FIG. 11 illustrates a Target Calibration Screen showing information thereon generated by the computer of the present invention.

FIG. 12 illustrates a Configuration Review Screen with information thereon generated by the computer of the present invention.

FIG. 13 illustrates a Dimension Input Screen with information thereon generated by the computer of the present invention.

FIG. 14A and 14B present the calculations that are conducted utilizing the input data and the measured data generated by the system.

DESCRIPTION OF THE PREFERRED EMBODIMENTS

Figure 1:
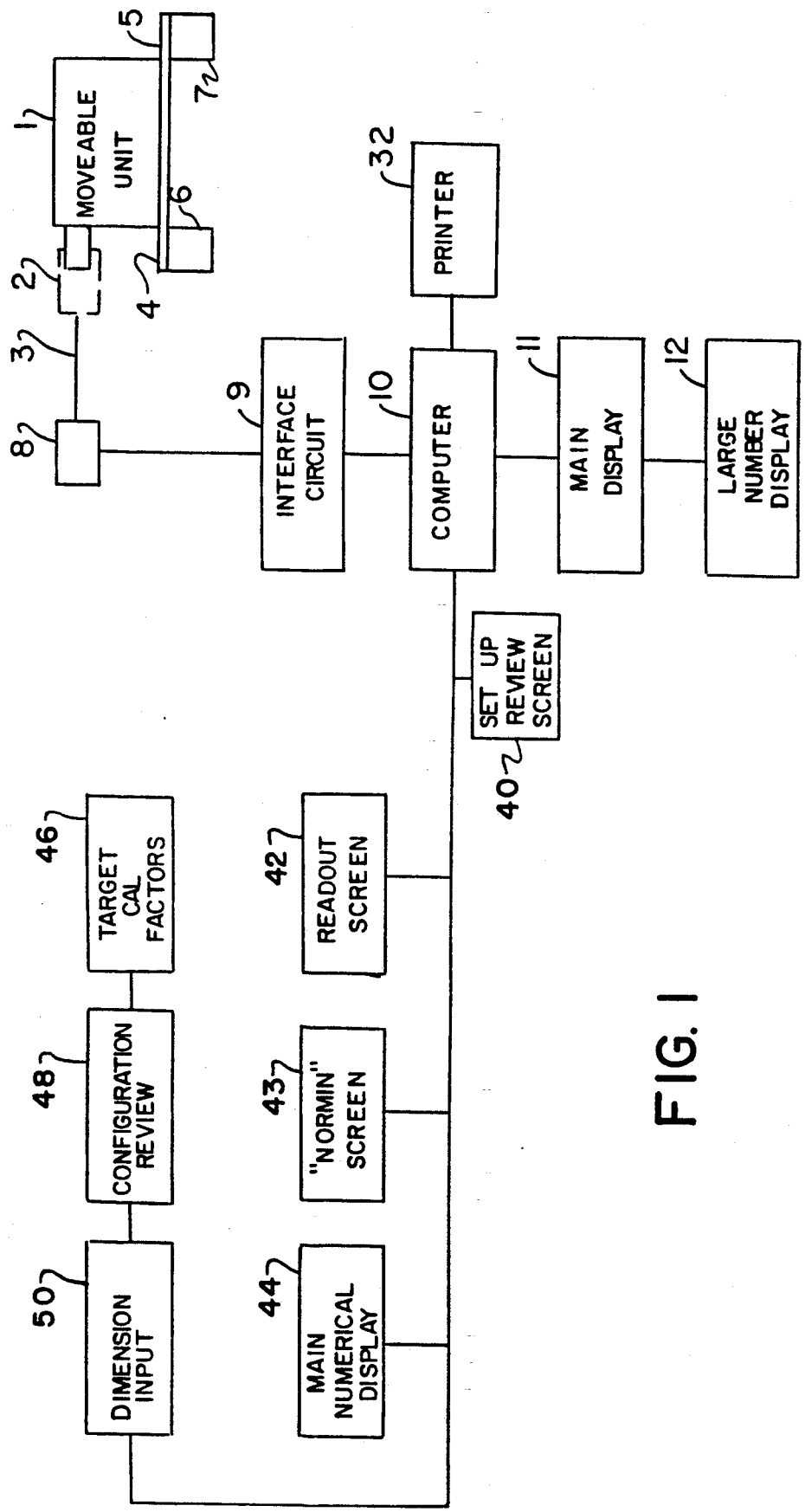
FIG. 1 is a general schematic of the system of the present invention.

FIG. I shows one arrangement for the system of the present invention where a movable unit 1, which may be either a "master part" or a rotatable tool holder, has mounted thereto a laser emitter 2 which emits a laser beam 3. The movable unit i is mounted on shim feet 4 and 5 which respectively rest on shim assemblies 6 and 7. The shim assemblies 6 and 7 can be adjusted, whereupon the positions of shim feet 4 and 5 and hence the position of the movable unit 1 and the laser emitter 2 can be moved such that the alignment of the laser beam 3 is changed. The laser beam 3 impinges on a photosensitive target 8 which is mounted on either a "master part" or rotatable tool holder. The target 8 may be a Model T-261 target manufactured by Hamar Laser Instruments, Inc. Information as to the position and angle of incidence of the laser beam 3 on the target 8 is conveyed to interface circuitry 9 and hence to a computer 10. The computer 10 outputs information on a variety of displays including a main display 11, a large number display 12 and printer 32.

Figure 2:
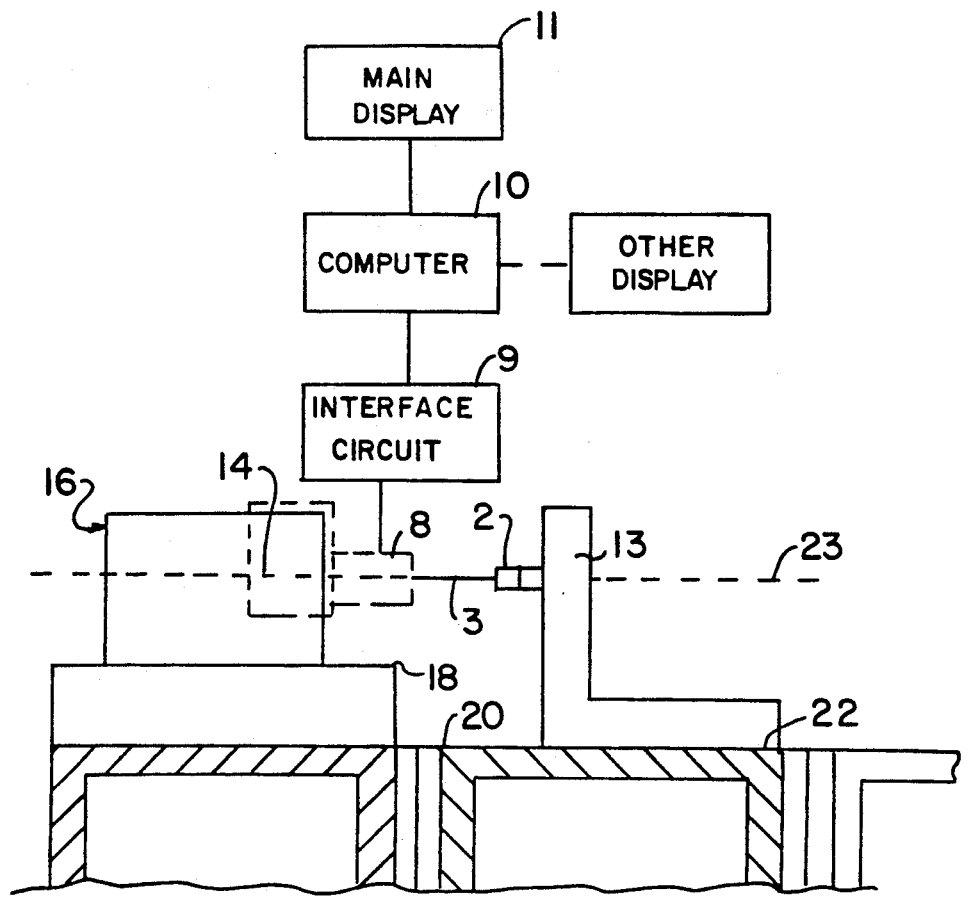
FIG. 2 is the schematic of a preferred embodiment of the system of the present invention.

FIG. 2 shows one possible arrangement of the components illustrated schematically in FIG. 1 wherein a master part 13 has the laser 2 mounted thereon to emit the beam 3. The beam 3 impinges upon target 8 which is mounted in a spindle 14 of a machine tool 16. The machine tool 16 rests on a shim assembly 18 which in turn is supported by wingbase 20. Likewise, the master part 13 is supported by centerbase 22. Information is conveyed from the target 8 through interface circuitry 9 to computer 10 which outputs spindle positioning and other information on the main display 11 and other displays whereupon an operator can correct the spindle alignment through use of the shim assembly 18.

As stated previously, the major steps of spindle alignment using the system of the subject invention are the making of the wingbase way straight, adjusting the wingbase ways such that they are parallel to the master part axis, making the spindle axis parallel to the master part axis and centering the spindle to the master part axis.

At the outset it should be noted that the master part axis is the primary reference generally used to align the spindles. Alignment of the spindle 14 to the axis 23 of the master part 13 in FIG. 2 is facilitated with the subject invention by the computer 10 which generates an "effective target". This "effective target" is a mathematical target which is always placed on a movable unit, such as the movable unit 1 in FIG. 1, by computer 10. The computer is able to "read" from the four-axis target 8 in FIG. 1 or 2 enough information so that it can calculate what this "effective target" should read had the target 8 really been mounted on the movable unit 1 of FIG. 1. The computer 10 displays this reading of the "effective target" through the main display 11 and/or any other display. The reading will be the same whether the laser 2 or the target 8 is mounted on the movable unit 1 of FIG. 1.

Figure 3:
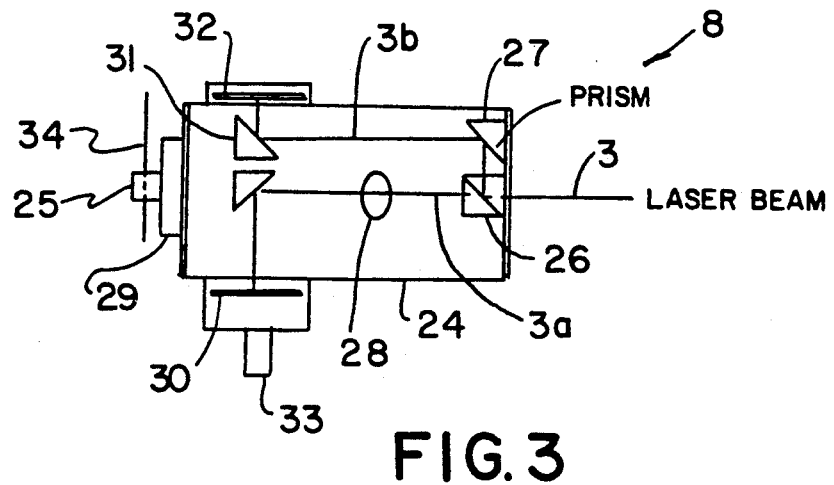
FIG. 3 is a cross-sectional view taken along a center line of the target of the present invention.

As shown in FIG. 3, the target 8 includes a housing 24 with a mounting stud 25 extending rigidly therefrom. The mounting stud 25 is dimensioned for mounting the target 8 in a spindle or master part, such as the spindle 14 or master part 13 depicted in FIG. 2. A beam splitter 26 is mounted in the housing 24 and is operative to transmit approximately 50% of the incoming laser beam 3. The transmitted beam is identified by the numeral 3a in FIG. 3. The remaining 50% of the incoming beam 3 is reflected 90° by the beam splitter 26 from its original path and toward a right angle prism 27. The prism 27 is operative to reflect the beam another 90°. This reflected beam is identified generally by the numeral 3b and extends substantially parallel to the transmitted beam 3a. The transmitted beam 3a passes through a collimating lens 28 and is reflected 90° again off prism 29 and toward a target cell 30. The beam 3b is reflected 90° off prism 31 toward target cell 32. The target cells 30 and 32 are electrically and operatively connected to the interface circuit 9 FIGS. 1 and 2 by cable 33, as shown in FIG. 3. Each target has an active flat surface or cell plane which is operative to collect the energy of the laser beam 3a or 3b impinging thereon, and to provide a signal identifying the position of the center of energy of the laser beam 3a or 3b thereon.

The effective cell plane 34 shown in FIG. 3 is a location spaced from the reflective surface of the prism 29 a distance which is equal to the distance between the reflective surface of the prism 29 and the target cell 30. The location of the effective cell plane 34 may be specifically identified on the mounting stud 25 of the target 8 to enable placement of the effective cell plane at a desired measurement or alignment point on the machine tool or master part depicted in FIG. 2. This construction, as explained in the above described prior art U.S. Pat. No. 4,483,618 enables the target 8 to function exactly as if the target cell 30 were placed at the effective cell plane 34. Additionally, as explained in the prior art U.S. Pat. No. 4,483,618, the illustrated disposition of the target cell 30 and the effective cell 34 renders the target 8 substantially insensitive to angular misalignment about the desired measurement or alignment point on the machine tool or master part. The target 8 illustrated in FIG. 3 provides certain advantages beyond those illustrated in the above referenced U.S. Pat. No. 4,483,618. In particular, the target 8 enables angular alignment data to be collected by the target cell 30 while displacement data is simultaneously being collected by the target cell 32. In contrast, the prior art targets had required these readings to be taken sequentially, with a collimating lens being selectively positioned in the path of the incoming laser beam. The construction of the target 8 illustrated in FIG. 3 enables the simultaneous assessment of displacement and alignment data, thereby greatly facilitating machine alignment processes. Additionally, the computer referred to herein enables the efficient use of the data collected by the target cells 30 and 32 to indicate alignment and displacement errors and to indicate the specific adjustments that will be needed for the particular machine tool station being aligned.

Figure 4:
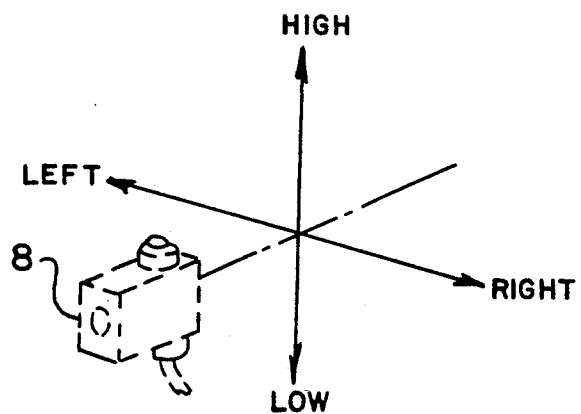
FIG. 4 is a perspective view illustrating the "effective target" concept of the present invention.

FIG. 4 is a perspective view of the target 8 which shows how the "effective cell plane" concept is especially useful because the "sense" of the readings—that is, high and low and left and right—are stated to be those which would be expected if one were looking into or at the spindle of the movable unit.

Figure 5:
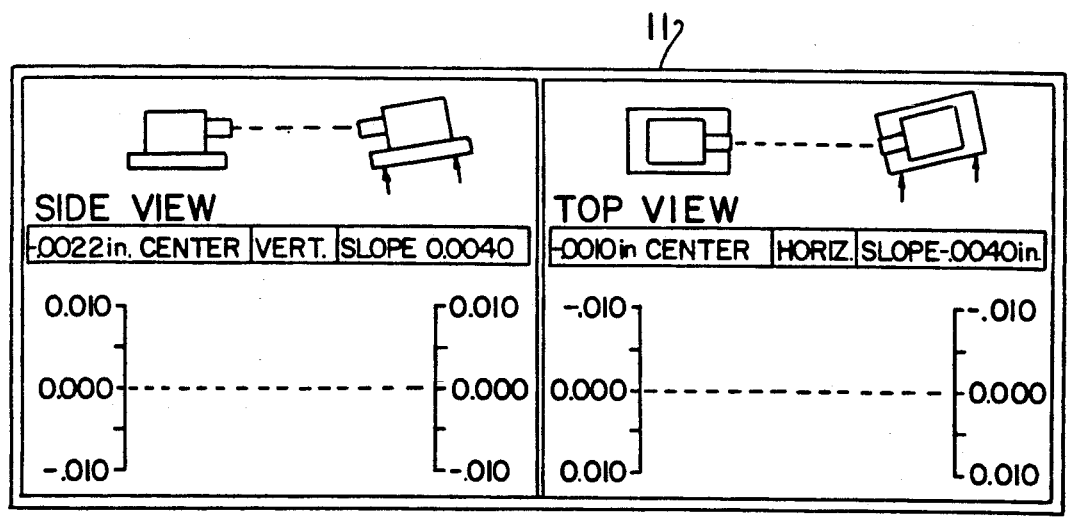
FIG. 5 illustrates a main display screen showing information output from the computer of the invention.

FIG. 5 shows the main display 11 generated by the computer 10 of the inventive system. As shown therein, the main display 11 gives both a side and top view of the spindle misalignment. The glyphs or pictures in the upper part are a "side" and "top" view of the spindle misalignment. They only show the direction of misalignment. On the other hand, the display on the lower half of FIG. 5 can be thought of as a representation of the spindle center line. It shows both the amount and direction of spindle center line misalignment. This display is active and will move proportionately to a spindle head move. When it shows 0—0 the spindle is aligned. The numbers in the middle refer to the error under the front and rear shim feet 4 and 5 (FIG. 1). This numerical display can be toggled between a "shim" display which shows the actual move required and an "error" display which shows the actual misalignment.

Figure 6:
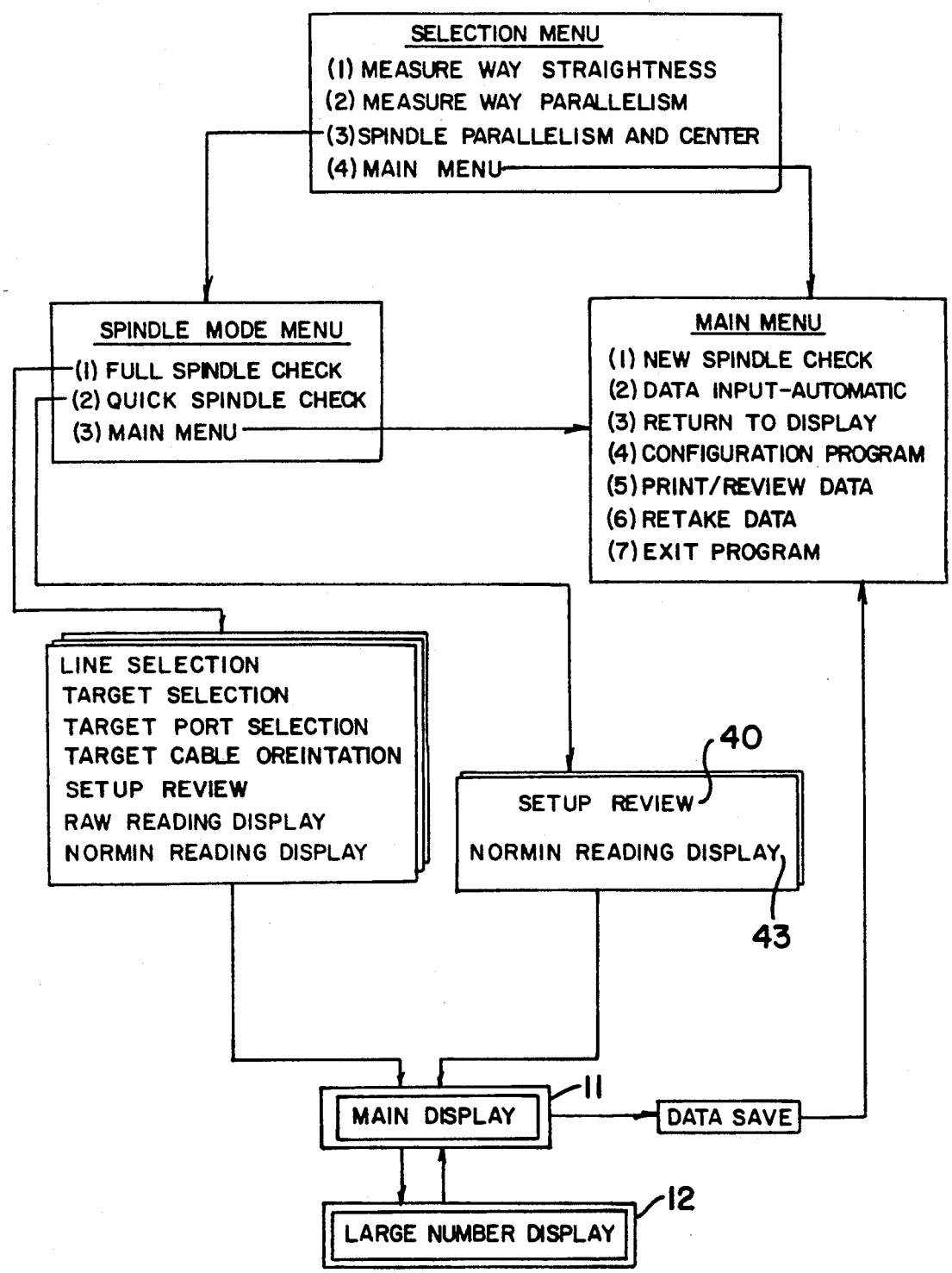
FIG. 6 is a flow chart illustrating how the various system processes of the invention are implemented in the computer of the invention.

Reference to the flow chart of FIG. 6 makes it clear that the main menu in the program represents the primary way of moving about the various parts of the program. Also, the main menu may be reached from any of the first operational menus ([1], [2]and [3]).

It should be noted that the main menu is not required for aligning spindles. However, if any number of functions such as calibration, recalling of data, resetting of some parameters or calibration of targets is necessary, the main menu is the choice to further direct the use to other parts of the program.

The seven main menu choices are herein described in some detail:

The new spindle check menu choice simply restarts the program with a brand new check. Selection of this menu choice merely restarts the operational steps of the program.

The data input-automatic menu selection merely facilitates a toggling operation wherein it allows the operator to switch between automatic or manual data input.

The return to display choice simply returns an operator back to the current display he or she had been working on. All data is retained and an operator may go "back to work" with that particular spindle.

The configuration program menu selection is a branch to the configuration (selection of spindle work station and line) and calibration portion of the program.

The print review data menu selection allows an operator to review data that has been saved. This can be current data for a spindle presently being worked on, or data from older spindle measurements. The data can be printed if desired.

The retake data menu choice is used when a spindle has been aligned and it is desired to take a new set of "Normin" readings prior to completing a job. If this menu choice is used, the operator is returned directly to the set-up review screen of FIG. 7 just prior to the "Normin" screen itself.

The exit program exits the program and returns the operator to disk operation system. At this point the computer would be turned off.

As shown in the flow chart of FIG. 6, the spindle mode menu comprises a first major branch in the program. Its menu choice selections comprise full spindle check, quick spindle check and main menu. The main menu choice has already been discussed in detail. Quick spindle check proceeds directly to the set-up review screen. A full spindle check requires the user to go through all the set-up screens.

The menu choices after a full spindle check are detailed as follows:

The line selection menu choice allows the operator to view a selection of three display screens respectively dedicated to the lines, stations, and heads of the manufacturing facility. This enables the operator to conform the computer to a particular configuration of line, station, and head that is being employed for a manufacturing operation.

Target selection is a menu choice wherein the operator "tells" the computer which target he or she is using. These targets can be listed by number. The program automatically loads calibration factors for the particular selected target.

The target port selection makes available to the operator a screen whereby the operator will "tell" the computer where he has connected the target shown in the screen above as, for example, by inputting the entries "connect target to port A" or "connect target to port B".

The target cable orientation menu allows the operator to "tell" the computer whether a 12-6 o'clock or 3-9 o'clock target cable orientation will be made for the "Normin" mounting error correction measurements.

Figure 7:
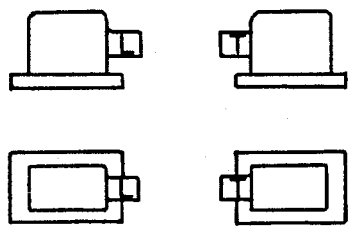
FIG. 7 shows a setup review screen with information thereon generated by the computer of the invention.

The quick spindle check menu selection on the spindle mode menu enables the operator to view the set-up review screen 40 of FIGS. 1 and 7. The pictures to the right on the screen of FIG. 7 show where the laser and target should be mounted for alignment. It is important that they be mounted as shown because the computer is "expecting" this set-up and will calculate and display the spindle misalignment based on the set-up shown.

Figure 8:
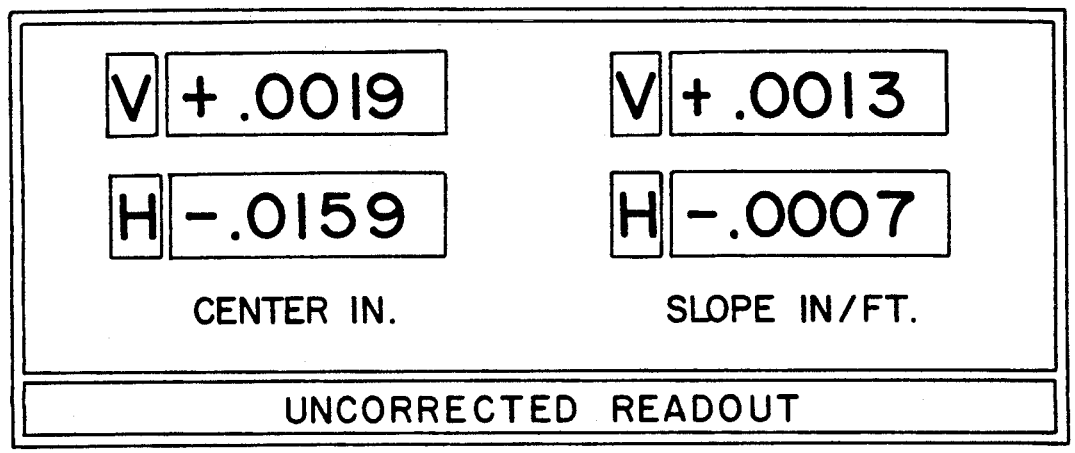
FIG. 8 shows a Raw Readout Screen with information thereof supplied from the computer of the present invention.

The raw reading display menu choice from the full spindle check menu displays for the operator the raw readout screen 42 of FIGS. 1 and 8. The raw readout screen shows four sets of numbers: vertical and horizontal center and vertical and horizontal angle. These readings are raw readings in that the operator is reading the target in its real location, not the "effective target". The entire purpose of the raw readout screen 42 of FIG. 8 is to allow the operator to detect whether the laser and target are properly mounted in their spindles. If they are poorly mounted due to chips, burrs or inaccurate fixturing, significant errors can result, especially if alignments of great precision are required.

Figure 9:
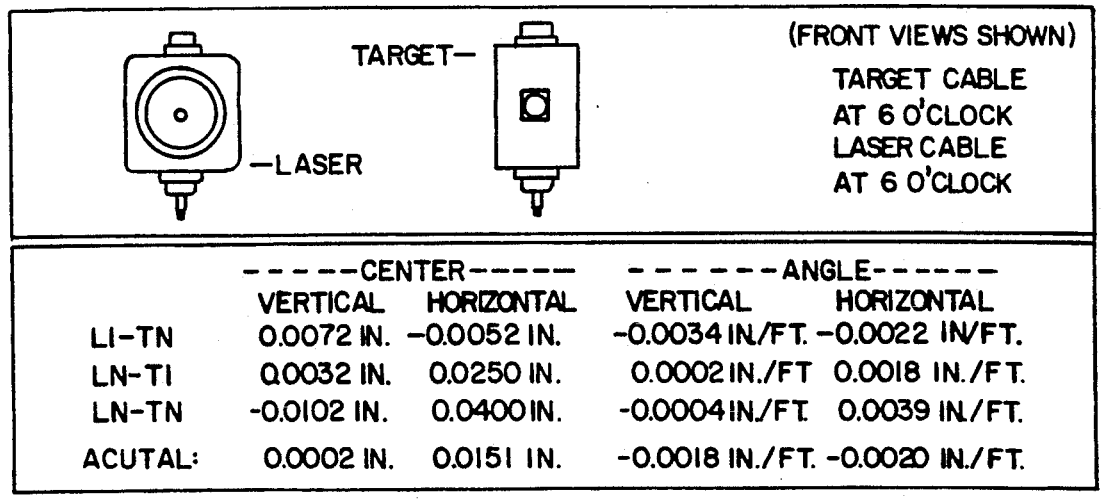
FIG. 9 illustrates a "Normin" Screen with information thereon generated by the computer of the present invention.

The "Normin" reading display menu 43 choice of the full spindle check menu shown in FIG. 6 results in the display of FIG. 9. The word "Normin" refers to the Normin principle of taking two reading of "NORMal reading" at 0° and an "INverted reading" at 180°. The two readings of the laser plane and the target plane are combined in the computer to determine the mounting errors of both laser and target. The computer can subtract the mounting errors from incoming "raw" reading and then display mounting errors that are "clean". The operator sees pure spindle to master part misalignment errors.

The target used with the computer program for "Normin" display is the simultaneous four-axis target that outputs both center and angle information at the same time. Only three "Normin" readings need be taken to establish the mounting errors. The upper left part of the screen of FIG. 9 shows the operator where to rotate the laser and target, and the upper right side tells the operator where to rotate the laser and target.

The numerical display 44 shown in FIGS. 1 and 10 for the full spindle check can be shown in any one of several configurations. It can show misalignment at the front and rear shim feet 4 and 5 (FIG. 1) as the main display or it can show center and slope misalignment. Choice of these modes depends on the prevailing conditions. In some cases, it is desirable to look directly at the slope. Generally speaking, spindles are adjusted for parallelism first and then for center. If shim moves are being made, then the ship type of display would be the better choice. The above mentioned full spindle numerical displays can be toggled between English and metric units.

The numerical display for quick spindle is exactly the same as for full spindle except it only shows center and angle mode. It cannot show shim errors, since this quick spindle has no dimensional information. The quick spindle portion of the program is thus unable to calculate the shim errors and moves.

In addition to the operations program whose flow chart is shown in FIG. 6, the computer of the inventive system described herein also has a program side in which configurations are established. The configuration side provides for two principal tasks to be performed, that is, target calibration and the setting up of configurations. The configuration side is reached through the configuration program choice on the main menu shown in FIG. 6. This is the side of the program where all configurations are set up or modified. The main menu for the configurations side of the program comprises the three choices of configuration and data menu, set up configuration, and return to main program. Among the screen displays output by the computer in response to the configuration side of the program are the target calibration factor screen 46 shown in FIGS. 1 and 11, the configuration review screen 48 of FIGS. 1 and 12 and the dimension input screen of FIGS. 1 and 13. The target calibration screen 46 shown in FIG. 1 and 11 discloses an active window entitled "Vertical-Angular Mode" which is an active readout for the axis of the target which has been highlighted. This window will "connect" to a different axis upon input from the operator. The configuration review screen 48 of FIGS. 1 and 12 allows the operator to review and change all of the choices made with regard to configuration information. After making a change, the operator is returned to the configuration review screen whereby additional changes can be made. When the configuration is correct, the operator must "name" the configuration which has been set up before programming can continue. Any configuration already stored can be copied and also any configuration can be deleted.

The dimension input screen 50 of FIGS. 1 13 denotes six dimensions by the letters A through F. The actual dimension required is shown by a two view picture on the right hand side of the screen. As a particular dimension is highlighted, such as the dimension "D=3.00 in" in FIG. 13, that letter designation is reverse videoed in the drawing to the right. Dimensions may be entered in either inches or millimeters. The program "remembers" all dimensions in English units and only converts to metric units when the metric option has been selected. The "file name" in the lower left corner is the name that this configuration is saved under on the disc. The computer remembers each configuration as a number so the line, station, and head designations are really saved in the file as numbers.

Figure 14A:
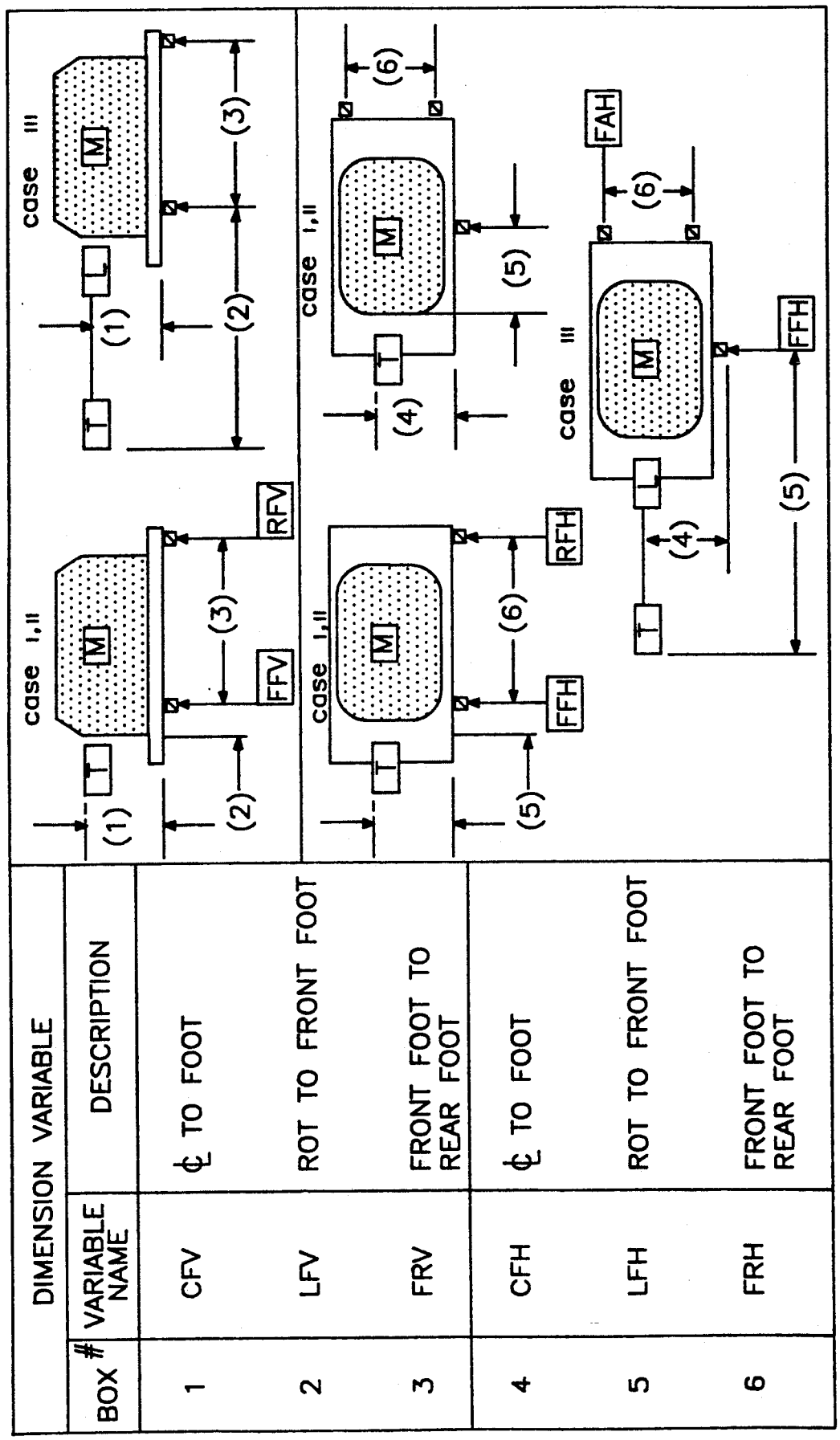

FIG. 14 displays the analysis completed by the system using input variables and measured data to determine the front foot and rear foot vertical adjustments (FFV and RFV) and the front foot and rear foot horizontal adjustments and horizontal angular adjustments (FFH, RFH and FAH). The abbreviations used in these equations are explained immediately before the equations in FIG. 14. In addition to those abbreviations, it should be noted that ABS is the standard abbreviation for absolute value, while the abbreviation ROT refers to "rear of target". It will be noted that the input data and the measured values are used in the equations to calculate shim adjustments even though the actual cell plane or "rear of target" is spaced a considerable distance from the shims or other such adjustment means, and in the case 3 illustration of FIG. 14, the rear of the target T is disposed on the nonadjustable member, while the laser L is mounted to the adjustable member.

Although preferred embodiments of the invention have been shown herein, numerous other embodiments within the scope of the appended claims will readily occur to those skilled in the relevant technical art.

What is claimed is:

1. A method of aligning at least one operating member to at least one workpiece comprising the steps of:

providing at least one master part representing a precisely finished workpiece;

providing laser means for generating a laser beam;

providing a photosensitive target capable of generating signals identifying locations at which the laser beam impinges on the photosensitive target;

providing a computer operatively connected to said target for storing dimensional data for said operating member and said master part and for determining alignment data based on the dimensional data and the signals from the photosensitive target;

mounting the laser means on a selected one of the master part and operating member;

mounting the photosensitive target on the other of said master part and the operating member and generally in line with the laser beam generated by the laser means;

inputting the signals from said photosensitive target to said computer for mathematically calculating alignment data for an effective target position which defines a preselected position relative to said master part and spaced from said photosensitive target; and displaying alignment information from said computer and relating to said effective target position for identifying alignment errors of said operating member relative to said master part.

2. A method as in claim 1 wherein the computer is operative to calculate alignment data for an effective target position disposed at a preselected position on the member to which the laser means is mounted.

3. A control system for aligning an operating member to a master part comprising:

a laser means for generating a laser beam, said laser means being removably mountable in a selected one of said operating member and said master part;

a photosensitive target capable of generating signals identifying locations at which the laser beam impinges thereon, said photosensitive target being removably mountable in a selected one of the operating member and the master part;

adjustable support means for adjustably supporting a selected one of the operating member and the master part;

computer means operatively connected to said target for storing dimensional data for said operating member and for said master part, and for mathematically calculating alignment data for an effective target position which defines a preselected position relative to said master part and spaced from said photosensitive target; and output means operatively connected to said computer means for generating adjustment data identifying adjustments to said adjustable support means necessary for aligning the laser beam with the effective target.

4. A method of aligning an adjustable member to a substantially unadjustable member comprising the steps of:

providing laser means for generating a laser beam;

providing a photosensitive target capable of generating signals identifying locations at which the laser beam impinges on the photosensitive target;

providing a computer operatively connected to said target for storing dimensional data for said adjustable member and said substantially unadjustable member and for determining alignment data based on the dimensional data and the signals from the photosensitive target;

mounting the laser means on the adjustable member;

mounting the photosensitive target on the substantially unadjustable member and generally in line with the laser beam generated by the laser means;

inputting the signals from the photosensitive target to said computer for mathematically calculating alignment data for the adjustable member; and displaying required adjustments for said adjustable member for aligning said adjustable member with said adjustable member.

5. A method of aligning at least one operating member to at least one workpiece comprising the steps of:

providing at least one master part representing a precisely finished workpiece, at least one of said master part and said operating member having means for adjusting alignment and position;

providing a laser means for generating a laser beam;

providing a photosensitive target capable of generating signals identifying locations at which the laser beam impinges on the photosensitive target;

providing a computer operatively connected to said target for storing dimensional data for said operating member and said master part and for determining alignment data based on the dimensional data and the signals from the photosensitive target;

mounting the laser means on a selected one of the master part and operating member;

mounting the photosensitive target on the other of said master part and the operating member and generally in line with the laser beam generated by the laser means;

inputting the signals from said photosensitive target to said computer for mathematically calculating alignment data for an effective target position which defines a preselected position relative to said master part and spaced from said photosensitive target; and displaying alignment information from said computer and relating to said effective target position for identifying alignment errors of said operating member relative to said master part and for identifying adjustments to the adjustment means for aligning the laser beam with the effective target.

6. A method as in claim 5 for aligning a selected one of a plurality of operating members to a selected one of a plurality of master parts, and wherein the method further comprises the steps of inputting dimensional data for each of said operating members and each of said master parts, and wherein the method further comprises the step of inputting to the computer the identity of a selected operating member and a selected master part to be aligned.

7. A method of aligning a selected one of a plurality of operating members to a selected one of a plurality of workpiece comprising the steps of:

provided a plurality of master parts representing a plurality of precisely finished workpieces;

providing a laser means for generating a laser beam;

providing a photosensitive target capable of generating signals identifying locations at which the laser beam impinges on the photosensitive target;

providing a computer operatively connected to said target for storing dimensional data for each of said operating members and each of said master parts and for determining alignment data based on the dimensional data and the signals from the photosensitive target;

mounting the laser means on a selected one of the master parts and operating members;

mounting and photosensitive target on another selected one of said master parts and said operating members and generally in line with the laser beam generated by the laser means;

inputting to the computer the identities of the master part and the operating member on which the laser means and the photosensitive target are mounted;

inputting the signals from said photosensitive target to said computer for mathematically calculating alignment data for an effective target position which defines a preselected position relative to said selected master part and spaced from said photosensitive target; and displaying alignment information from said computer and relating to said effective target position for identifying alignment errors of said selected operating member relative to said selected master part.

8. A control system for aligning an operating member to a master part comprising:

a laser means for generating a laser beam, said laser means being removably mountable in a selected one of said operating member and said master part;

a photosensitive target capable of generating signals identifying locations at which the laser beam impinges thereon, said photosensitive target being removably mountable in a selected one of the operating member and the master part, said photosensitive target comprising beam splitting means for dividing said laser beam into first and second laser beams, first and second target cells aligned respectively with said first and second split beams and a collimating lens disposed intermediate said beam splitting means and said second target cell such that said photosensitive target is capable of simultaneously generating signals corresponding to angular alignment errors and signals corresponding to offset errors;

adjustable support means for adjustably supporting a selected one of the operating member and the master part;

computer means operatively connected to said target for storing dimensional data for said operating member and for said master part, and for calculating alignment data for an effective target position which defines a preselected position relative to said master part and spaced from said photosensitive target; and output means operatively connected to said computer means for generating adjustment data identifying adjustments to said adjustable support means necessary for aligning the laser beam with the effective target.

9. A control system as in claim 8 wherein said output means is operative to simultaneously generate data identifying angular errors and offset errors.

* * * * *